US008388156B2

(12) United States Patent
Chen

(10) Patent No.: US 8,388,156 B2
(45) Date of Patent: Mar. 5, 2013

(54) BACKLIGHT APPARATUS AND KEYBOARD

(75) Inventor: Barry Chen, Taoyuan (TW)

(73) Assignee: Darfon Electronics Corp., Gueishan, Taoyuan (TW)

( * ) Notice: Subject to any disclaimer, the term of this patent is extended or adjusted under 35 U.S.C. 154(b) by 456 days.

(21) Appl. No.: 12/868,697

(22) Filed: Aug. 25, 2010

(65) Prior Publication Data

US 2011/0048913 A1 Mar. 3, 2011

(30) Foreign Application Priority Data

Aug. 26, 2009 (TW) ............................... 98215743 U

(51) Int. Cl.
*G01D 11/28* (2006.01)

(52) U.S. Cl. ............... 362/23; 362/29; 362/85; 200/310

(58) Field of Classification Search .................... 362/23, 362/29–30, 85, 36, 249.09, 183; 200/310–314, 200/317

See application file for complete search history.

(56) References Cited

U.S. PATENT DOCUMENTS

| | | | | |
|---|---|---|---|---|
| 6,860,612 | B2 | 3/2005 | Chiang | |
| 7,086,768 | B2 * | 8/2006 | Suwa et al. | 362/555 |
| 7,883,256 | B2 * | 2/2011 | Winkler | 362/615 |
| 2003/0103359 | A1 * | 6/2003 | Chiang et al. | 362/558 |
| 2005/0270760 | A1 * | 12/2005 | Hung | 362/23 |
| 2009/0173610 | A1 * | 7/2009 | Bronstein et al. | 200/314 |

FOREIGN PATENT DOCUMENTS

| | | |
|---|---|---|
| TW | 509955 | 11/2002 |
| WO | 2008050504 A1 | 5/2008 |

* cited by examiner

*Primary Examiner* — Anne Hines
(74) *Attorney, Agent, or Firm* — Winston Hsu; Scott Margo

(57) ABSTRACT

A backlight apparatus includes a light-guiding plate, two first light-emitting members and two second light-emitting members. The light-guiding plate has a first edge and a second edge parallel to the first edge. The light-guiding plate has two first recesses and two second recesses. The two first light-emitting members are disposed in the two first recesses respectively, and the two second light-emitting members are disposed in the two second recesses respectively. The two first light-emitting members are rotated at a predetermined angle respectively, such that first light-emitting axes of the two first light-emitting members tend toward the first edge and the second edge of the light-guiding plate respectively. Besides, second light-emitting axes of the two second light-emitting members are parallel to the first edge and the second edge of the light-guiding plate.

18 Claims, 5 Drawing Sheets

BACKLIGHT APPARATUS AND KEYBOARD

BACKGROUND OF THE INVENTION

1. Field of the Invention

The invention relates to a backlight apparatus and, more particularly, to a backlight apparatus applied to a light-emitting keyboard. Furthermore, the backlight apparatus can effectively light up corners of the light-emitting keyboard, such that the corners of the light-emitting keyboard have sufficient illumination.

2. Description of the Prior Art

With the development of technology recently, a great diversity of keyboards is designed. Sales volume of keyboard is influenced not only by functions but also by eye-appealing effects. For example, light-emitting keyboards are available on the market. The light-emitting keyboards are not only eye-appealing but also capable of being used at night or in the dark. Therefore, the light-emitting keyboards have more potential than the keyboards without light-emitting function.

However, conventional light-emitting keyboards have lower illumination in two corners of the last row, and the illumination is lower than five nits after being measured. Therefore, the corners of the keyboards are in a dark field, and illumination of the light-emitting keyboards is not uniform.

SUMMARY OF THE INVENTION

Therefore, an objective of the invention is to provide a backlight apparatus.

According to a first embodiment, a backlight apparatus of the invention comprises a light-guiding plate, two first light-emitting members and two second light-emitting members. In practical application, the backlight apparatus further comprises a circuit board, and the two first light-emitting members and the two second light-emitting members are electrically connected to the circuit board. Besides, each of the light-emitting members can be a light emitting diode.

The light-guiding plate has a first edge and a second edge parallel to the first edge. A reference axis is defined on the light-guiding plate and parallel to the first edge and the second edge. The light-guiding plate has two first recesses and two second recesses. The two first light-emitting members are disposed in the two first recesses respectively and emit light toward a first direction. Besides, each of the two first light-emitting members has a first light-emitting axis, wherein the first light-emitting axis of one of the two first light-emitting members tends toward the first edge and has a first angle with respect to the reference axis, and the first light-emitting axis of the other one of the two first light-emitting members tends toward the second edge and has a second angle with respect to the reference axis.

The two second light-emitting members are disposed in the two second recesses respectively and emit light toward a second direction opposite to the first direction. Besides, each of the two second light-emitting members has a second light-emitting axis parallel to the reference axis.

In this embodiment, a first axis and a second axis may be defined on the light-guiding plate and perpendicular to the reference axis. The first axis and the second axis are departed from each other with a distance, the two first light-emitting members are disposed along the first axis, and the two second light-emitting members are disposed along the second axis.

According to a second embodiment, a backlight apparatus of the invention comprises a light-guiding plate, two first light-emitting members, two second light-emitting members, a third light-emitting member and a fourth light-emitting member. In practical application, the backlight apparatus further comprises a circuit board. The two first light-emitting members, the two second light-emitting members, the third light-emitting member and the fourth light-emitting member are electrically connected to the circuit board.

The light-guiding plate has a first edge and a second edge parallel to the first edge. A reference axis is defined on the light-guiding plate and parallel to the first edge and the second edge. The light-guiding plate has two first recesses, two second recesses, a third recess and a fourth recess. The two first light-emitting members are disposed in the two first recesses respectively and emit light toward a first direction. Besides, each of the two first light-emitting members has a first light-emitting axis, wherein the first light-emitting axis of one of the two first light-emitting members tends toward the first edge and has a first angle with respect to the reference axis, and the first light-emitting axis of the other one of the two first light-emitting members tends toward the second edge and has a second angle with respect to the reference axis. The third light-emitting member is disposed in the third recess and emits light toward the second direction. The third light-emitting member has a third light-emitting axis parallel to the reference axis. The fourth light-emitting member is disposed in the fourth recess and emits light toward the first direction. The fourth light-emitting member has a fourth light-emitting axis parallel to the reference axis.

In this embodiment, a first axis and a second axis may be defined on the light-guiding plate and perpendicular to the reference axis. The first axis and the second axis are departed from each other with a distance. The two first light-emitting members and the third light-emitting member are disposed along the first axis, and the two second light-emitting members and the fourth light-emitting member are disposed along the second axis.

Another objective of the invention is to provide a keyboard equipped with the backlight apparatus of the invention.

According to another embodiment, a keyboard of the invention comprises a plurality of keyswitches and a backlight apparatus. The backlight apparatus is disposed under the plurality of keyswitches and used to light up the plurality of keyswitches. It should be noted that the backlight apparatus of the first or second embodiment can be selectively applied to the backlight apparatus of this embodiment, so the detail of the backlight apparatus is not depicted herein.

These and other objectives of the present invention will no doubt become obvious to those of ordinary skill in the art after reading the following detailed description of the preferred embodiment that is illustrated in the various figures and drawings.

DETAILED DESCRIPTION

The invention relates to a backlight apparatus and, more particularly, to a backlight apparatus applied to a light-emitting keyboard. Furthermore, the backlight apparatus can effectively light up corners of the light-emitting keyboard, such that the corners of the light-emitting keyboard have sufficient illumination.

Figure 1:
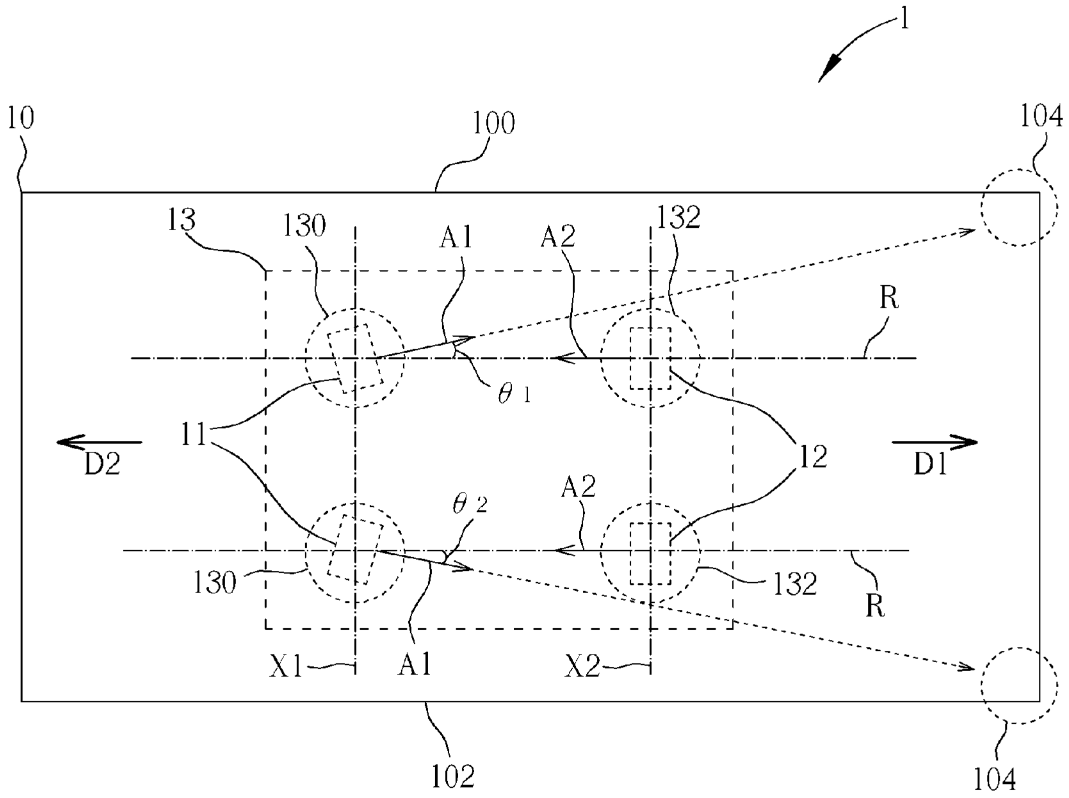
FIG. 1 is a schematic diagram illustrating a backlight apparatus according to a first embodiment of the invention.

Referring to FIG. 1, FIG. 1 is a schematic diagram illustrating a backlight apparatus 1 according to a first embodiment of the invention.

As shown in FIG. 1, the backlight apparatus 1 comprises a light-guiding plate 10, two first light-emitting members 11, two second light-emitting members 12 and a circuit board 13. The two first light-emitting members 11 and the two second light-emitting members 12 are electrically connected to the circuit board 13. The light-guiding plate 10 is disposed on the circuit board 13. The light-guiding plate 10 has two first recesses 130 and two second recesses 132. The two first light-emitting members 11 are disposed in the two first recesses 130 respectively, and the two second light-emitting members 12 are disposed in the two second recesses 132 respectively. In practical application, each of the light-emitting members 11 and 12 can be, but not limited to, a light emitting diode.

It should be noted that the two first light-emitting members 11 emit light toward a first direction D1, and the two second light-emitting members 12 emit light toward a second direction D2 opposite to the first direction D1. As shown in FIG. 1, the first direction D1 represents right direction of the light-guiding plate 10, and the second direction D2 represents left direction of the light-guiding plate 10.

The light-guiding plate 10 has a first edge 100 and a second edge 102 parallel to the first edge 100. For example, the light-guiding plate 10 can be a rectangular light-guiding plate, and the first edge 100 and the second edge 102 can be two longitudinal edges of the rectangular light-guiding plate.

Besides, a reference axis R may be defined on the light-guiding plate 10 and parallel to the first edge 100 and the second edge 102. It should be noted that each of the two first light-emitting members 11 has a first light-emitting axis A1. The first light-emitting axis A1 of the upper first light-emitting member 11 tends toward the first edge 100 of the light-guiding plate 10 and has a first angle θ1 with respect to the reference axis R. The first light-emitting axis A1 of the lower first light-emitting member 11 tends toward the second edge 102 of the light-guiding plate 10 and has a second angle θ2 with respect to the reference axis R. Each of the two second light-emitting members 12 also has a second light-emitting axis A2. However, compared to the first light-emitting axes A1 of the two first light-emitting members 11, the second light-emitting axes A2 of the two second light-emitting members 12 are parallel to the reference axis R. It should be noted that the first angle θ1 and the second angle θ2 are determined by the position of the first light-emitting members 11 and the size of the light-guiding plate 10, and the first light-emitting axes A1 should point toward corners 104 of the light-guiding plate 10.

Besides, as shown in FIG. 1, a first axis X1 and a second axis X2 may be defined on the light-guiding plate 10 and perpendicular to the reference axis R. The first axis X1 and the second axis X2 are departed from each other with a distance, the two first light-emitting members 11 are disposed along the first axis X1, and the two second light-emitting members 12 are disposed along the second axis X2. The two first light-emitting members 11 may be, but not limited to, aligned with the two second light-emitting members 12 respectively, as shown in FIG. 1.

It should be noted that the two first light-emitting members 11 may be directional light-emitting diodes. When the backlight apparatus 1 is applied to a light-emitting keyboard, the first light-emitting members 11 can emit light toward the corners 104 of the light-guiding plate 10 along the first light-emitting axes A1 since the two first light-emitting members 11 are rotated at a predetermined angle, so as to light up the corners 104. Accordingly the corners 104 of the keyboard will have sufficient illumination rather than being in a dark field.

Figure 2:
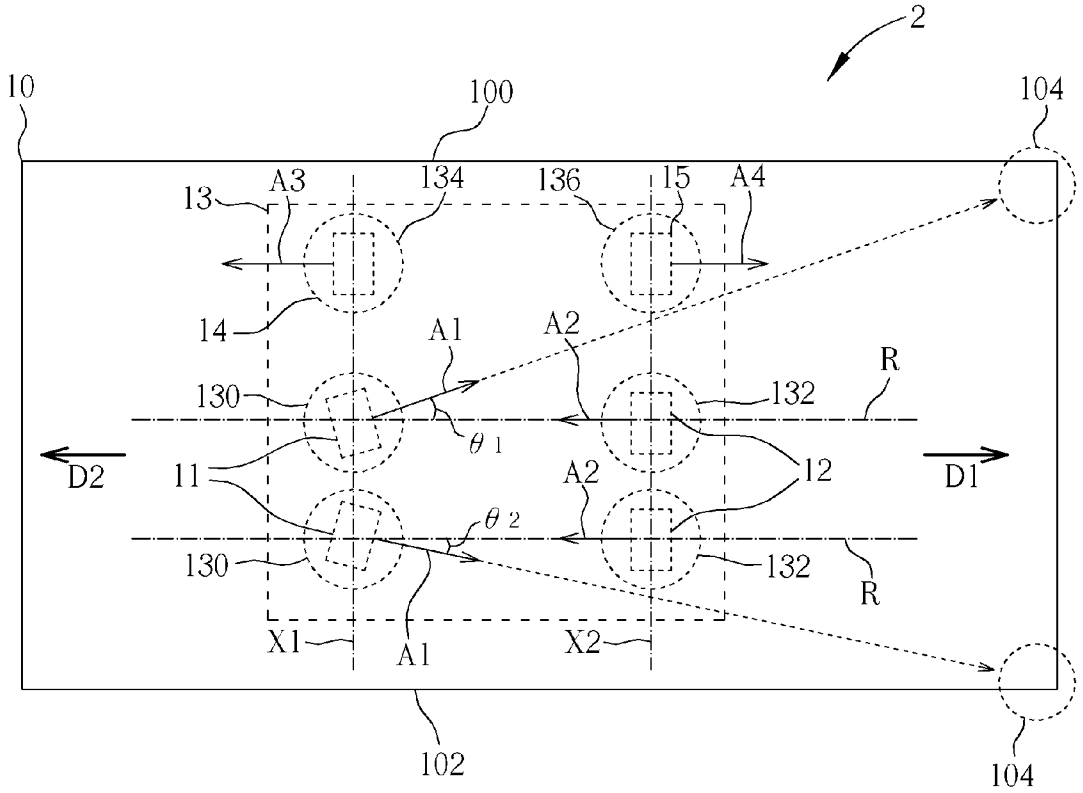
FIG. 2 is a schematic diagram illustrating a backlight apparatus according to a second embodiment of the invention.

Referring to FIG. 2, FIG. 2 is a schematic diagram illustrating a backlight apparatus 2 according to a second embodiment of the invention.

Compared to the first embodiment shown in FIG. 1, the backlight apparatus 2 of the second embodiment further comprises a third light-emitting member 14 and a fourth light-emitting member 15. The third light-emitting member 14 and the fourth light-emitting member 15 are electrically connected to the circuit board 13 as well. Besides, the light-guiding plate 10 further has a third recess 134 and a fourth recess 136 correspondingly. The third light-emitting member 14 is disposed in the third recess 134 and emits light toward the second direction D2. The third light-emitting member 14 has a third light-emitting axis A3 parallel to the reference axis R. The fourth light-emitting member 15 is disposed in the fourth recess 136 and emits light toward the first direction D1. The fourth light-emitting member 15 also has a fourth light-emitting axis A4 parallel to the reference axis R.

Figure 3:
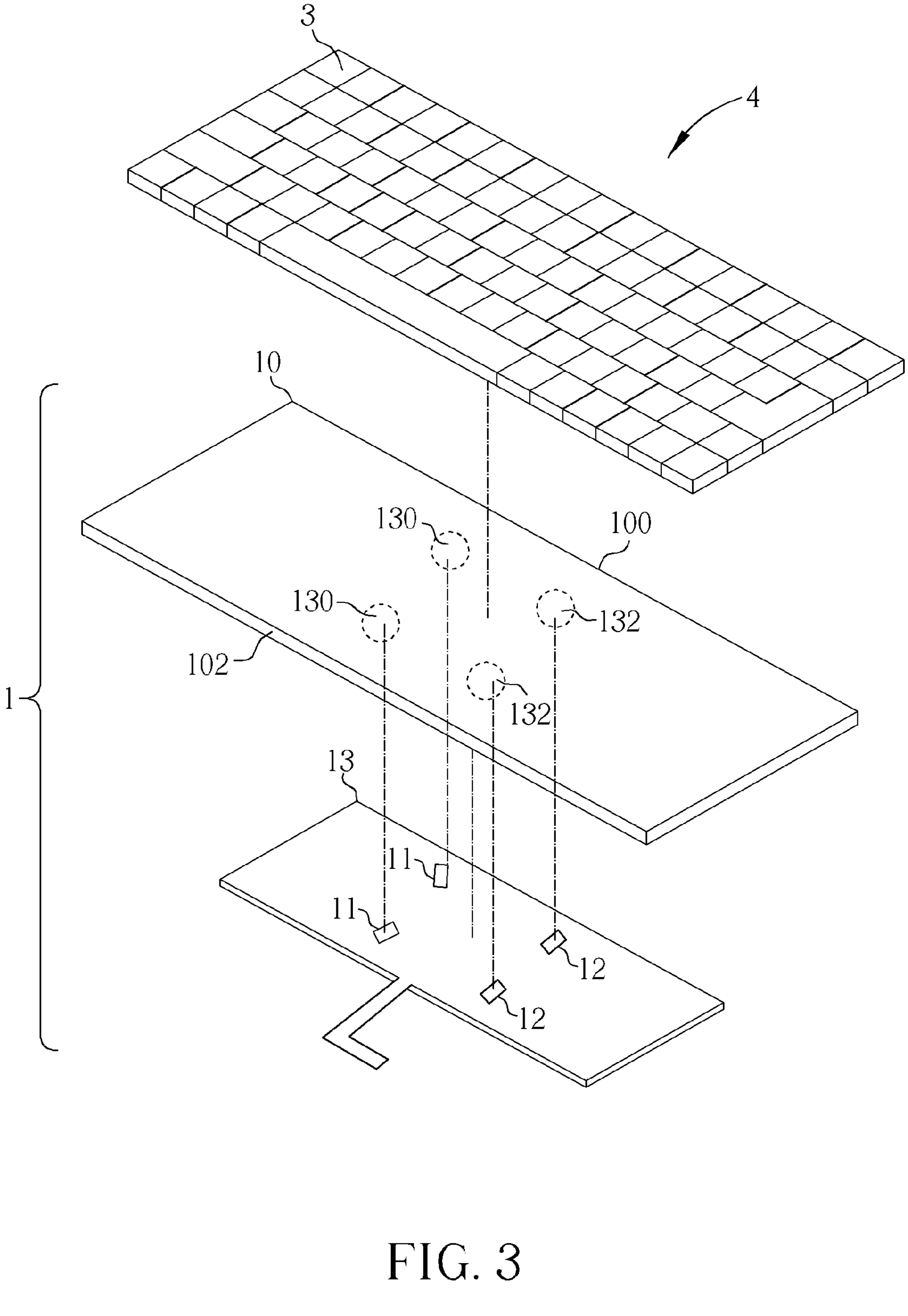
FIG. 3 is an exploded diagram illustrating a keyboard according to an embodiment of the invention.

Referring to FIG. 3, FIG. 3 is an exploded diagram illustrating a keyboard 4 according to an embodiment of the invention.

As shown in FIG. 3, the keyboard 4 comprises a plurality of keyswitches 3 and a backlight apparatus 1. The backlight apparatus 1 is disposed under the plurality of keyswitches 3 and used to light up the plurality of keyswitches 3. It should be noted that the detail of the backlight apparatus 1 has been mentioned above and shown in FIG. 1, so it will not be depicted herein.

In general, the illumination of the last row of a light-emitting keyboard is usually lower than other rows. When the backlight apparatus of the invention is applied to the light-emitting keyboard, the first light-emitting members can emit light toward the corners of the light-emitting keyboard along the first light-emitting axes since the first light-emitting members are rotated at a predetermined angle, so as to light up the corners. Accordingly, illumination of the light-emitting keyboard will be uniform.

Figure 5:
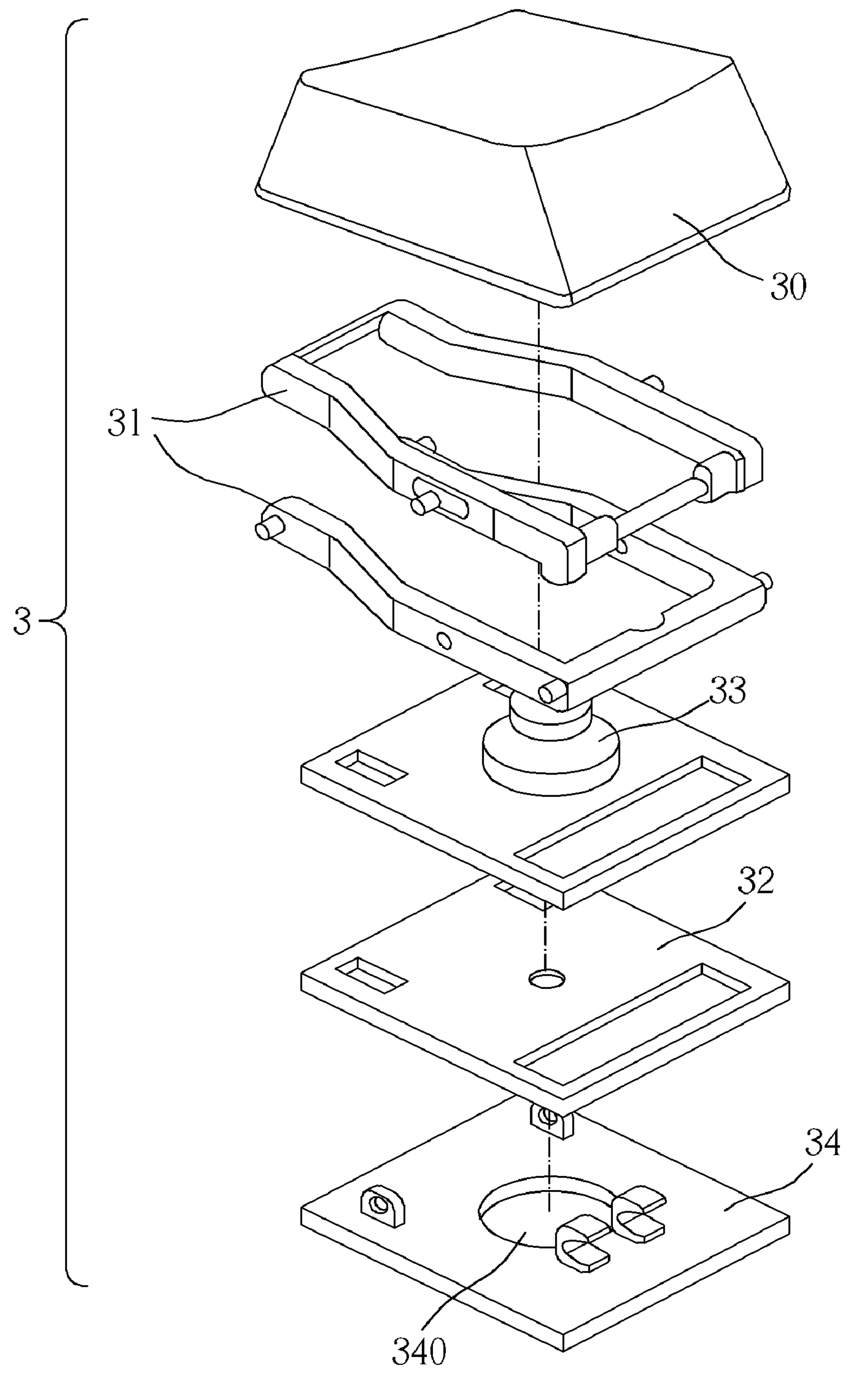
FIG. 5 is an exploded diagram illustrating a keyswitch of a keyboard according to an embodiment of the invention.

Referring to FIG. 5, FIG. 5 is an exploded diagram illustrating a keyswitch 3 of a keyboard according to an embodiment of the invention.

Each of the keyswitches 3 comprises a key cap 30, a supporting structure 31, a circuit membrane 32, a resilient member 33 and a base 34. The resilient member 33 is disposed on the circuit membrane 32. A through hole 340 is formed on the base 34 and corresponding to the key cap 30, such that the light emitted by the backlight apparatus can be guided to the key cap 30 through the through hole 340. The circuit membrane 32 is disposed between the key cap 30 and the base 34. The supporting structure 31 supports the key cap 30 on the base 34, such that the key cap 30 is capable of moving vertically relative to the base 34.

Figure 4:
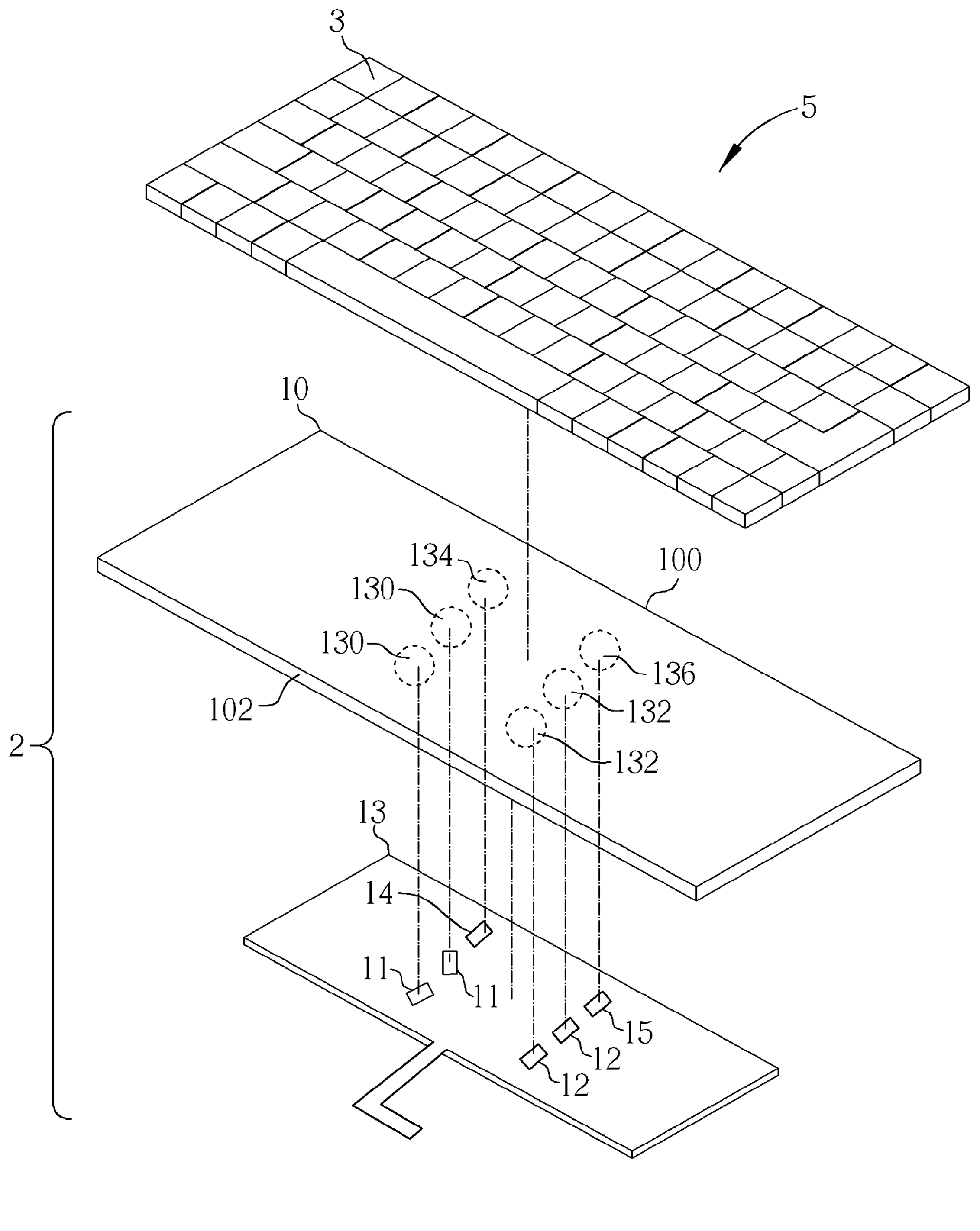
FIG. 4 is an exploded diagram illustrating a keyboard according to another embodiment of the invention.

Referring to FIG. 4, FIG. 4 is an exploded diagram illustrating a keyboard 5 according to another embodiment of the invention.

In this embodiment, the keyboard 5 comprises a plurality of keyswitches 3 and a backlight apparatus 2. It should be noted that the detail of the backlight apparatus 2 has been mentioned above and shown in FIG. 2, so it will not be depicted again herein.

As mentioned in the above, when the backlight apparatus of the invention is applied to a light-emitting keyboard, the first light-emitting members (e.g. directional light-emitting diodes) can emit light toward the corners of the light-emitting keyboard along the first light-emitting axes since the first light-emitting members are rotated at a predetermined angle, so as to light up the corners. Accordingly, illumination of the light-emitting keyboard will be more uniform.

Those skilled in the art will readily observe that numerous modifications and alterations of the device and method may be made while retaining the teachings of the invention.

What is claimed is:

1. A backlight apparatus comprising:

a light-guiding plate having a first edge and a second edge parallel to the first edge, a reference axis being defined on the light-guiding plate and parallel to the first edge and the second edge, the light-guiding plate having two first recesses and two second recesses;

two first light-emitting members disposed in the two first recesses respectively, the two first light-emitting members emitting light toward a first direction, each of the two first light-emitting members having a first light-emitting axis, wherein the first light-emitting axis of one of the two first light-emitting members tends toward the first edge and has a first angle with respect to the reference axis, and the first light-emitting axis of the other one of the two first light-emitting members tends toward the second edge and has a second angle with respect to the reference axis; and two second light-emitting members disposed in the two second recesses respectively, the two second light-emitting members emitting light toward a second direction opposite to the first direction, each of the two second light-emitting members having a second light-emitting axis parallel to the reference axis.

2. The backlight apparatus of claim 1, wherein a first axis and a second axis are defined on the light-guiding plate and perpendicular to the reference axis, the first axis and the second axis are departed from each other with a distance, the two first light-emitting members are disposed along the first axis, and the two second light-emitting members are disposed along the second axis.

3. The backlight apparatus of claim 2, wherein the two first light-emitting members are aligned with the two second light-emitting members respectively.

4. The backlight apparatus of claim 1, further comprising a circuit board, the two first light-emitting members and the two second light-emitting members are electrically connected to the circuit board.

5. A keyboard comprising:

a plurality of keyswitches; and a backlight apparatus disposed under the plurality of keyswitches and used to light up the plurality of keyswitches, the backlight apparatus comprising:

a light-guiding plate having a first edge and a second edge parallel to the first edge, a reference axis being defined on the light-guiding plate and parallel to the first edge and the second edge, the light-guiding plate having two first recesses and two second recesses;

two first light-emitting members disposed in the two first recesses respectively, the two first light-emitting members emitting light toward a first direction, each of the two first light-emitting members having a first light-emitting axis, wherein the first light-emitting axis of one of the two first light-emitting members tends toward the first edge and has a first angle with respect to the reference axis, and the first light-emitting axis of the other one of the two first light-emitting members tends toward the second edge and has a second angle with respect to the reference axis; and two second light-emitting members disposed in the two second recesses respectively, the two second light-emitting members emitting light toward a second direction opposite to the first direction, each of the two second light-emitting members having a second light-emitting axis parallel to the reference axis.

6. The keyboard of claim 5, wherein a first axis and a second axis are defined on the light-guiding plate and perpendicular to the reference axis, the first axis and the second axis are departed from each other with a distance, the two first light-emitting members are disposed along the first axis, and the two second light-emitting members are disposed along the second axis.

7. The keyboard of claim 6, wherein the two first light-emitting members are aligned with the two second light-emitting members respectively.

8. The keyboard of claim 5, wherein each of the keyswitches comprises a key cap, a supporting structure, a circuit membrane and a base, a hole is formed on the base with respect to the key cap, the circuit membrane is disposed between the key cap and the base, the key cap is disposed on the base via the supporting structure, such that the key cap is capable of moving vertically relative to the base.

9. The keyboard of claim 5, further comprising a circuit board, the two first light-emitting members and the two second light-emitting members are electrically connected to the circuit board.

10. A backlight apparatus comprising:

a light-guiding plate having a first edge and a second edge parallel to the first edge, a reference axis being defined on the light-guiding plate and parallel to the first edge and the second edge, the light-guiding plate having two first recesses, two second recesses, one third recess and one fourth recess;

two first light-emitting members disposed in the two first recesses respectively, the two first light-emitting members emitting light toward a first direction, each of the two first light-emitting members having a first light-emitting axis, wherein the first light-emitting axis of one of the two first light-emitting members tends toward the first edge and has a first angle with respect to the reference axis, and the first light-emitting axis of the other one of the two first light-emitting members tends toward the second edge and has a second angle with respect to the reference axis;

two second light-emitting members disposed in the two second recesses respectively, the two second light-emitting members emitting light toward a second direction opposite to the first direction, each of the two second light-emitting members having a second light-emitting axis parallel to the reference axis;

a third light-emitting member disposed in the third recess, the third light-emitting member emitting light toward the second direction, the third light-emitting member having a third light-emitting axis parallel to the reference axis; and a fourth light-emitting member disposed in the fourth recess, the fourth light-emitting member emitting light toward the first direction, the fourth light-emitting member having a fourth light-emitting axis parallel to the reference axis.

11. The backlight apparatus of claim 10, wherein a first axis and a second axis are defined on the light-guiding plate and perpendicular to the reference axis, the first axis and the second axis are departed from each other with a distance, the two first light-emitting members and the third light-emitting member are disposed along the first axis, and the two second light-emitting members and the fourth light-emitting member are disposed along the second axis.

12. The backlight apparatus of claim 11, wherein the two first light-emitting members are aligned with the two second light-emitting members respectively, and the third light-emitting member is aligned with the fourth light-emitting member.

13. The backlight apparatus of claim 10, further comprising a circuit board, the two first light-emitting members, the two second light-emitting members, the third light-emitting member and the fourth light-emitting member are electrically connected to the circuit board.

14. A keyboard comprising:

a plurality of keyswitches, and a backlight apparatus disposed under the plurality of keyswitches and used to light up the plurality of keyswitches, the backlight apparatus comprising:

a light-guiding plate having a first edge and a second edge parallel to the first edge, a reference axis being defined on the light-guiding plate and parallel to the first edge and the second edge, the light-guiding plate having two first recesses, two second recesses, one third recess and one fourth recess;

two first light-emitting members disposed in the two first recesses respectively, the two first light-emitting members emitting light toward a first direction, each of the two first light-emitting members having a first light-emitting axis, wherein the first light-emitting axis of one of the two first light-emitting members tends toward the first edge and has a first angle with respect to the reference axis, and the first light-emitting axis of the other one of the two first light-emitting members tends toward the second edge and has a second angle with respect to the reference axis;

two second light-emitting members disposed in the two second recesses respectively, the two second light-emitting members emitting light toward a second direction opposite to the first direction, each of the two second light-emitting members having a second light-emitting axis parallel to the reference axis;

a third light-emitting member disposed in the third recess, the third light-emitting member emitting light toward the second direction, the third light-emitting member having a third light-emitting axis parallel to the reference axis; and a fourth light-emitting member disposed in the fourth recess, the fourth light-emitting member emitting light toward the first direction, the fourth light-emitting member having a fourth light-emitting axis parallel to the reference axis.

15. The keyboard of claim 14, wherein a first axis and a second axis are defined on the light-guiding plate and perpendicular to the reference axis, the first axis and the second axis are departed from each other with a distance, the two first light-emitting members and the third light-emitting member are disposed along the first axis, and the two second light-emitting members and the fourth light-emitting member are disposed along the second axis.

16. The keyboard of claim 15, wherein the two first light-emitting members are aligned with the two second light-emitting members respectively, and the third light-emitting member is aligned with the fourth light-emitting member.

17. The keyboard of claim 14, further comprising a circuit board, the two first light-emitting members, the two second light-emitting members, the third light-emitting member and the fourth light-emitting member are electrically connected to the circuit board.

18. The keyboard of claim 14, wherein each of the keyswitches comprises a key cap, a supporting structure, a circuit membrane and a base, a hole is formed on the base with respect to the key cap, the circuit membrane is disposed between the key cap and the base, the key cap is disposed on the base via the supporting structure, such that the key cap is capable of moving vertically relative to the base.

* * * * *